United States Patent
Wu

(10) Patent No.: US 11,880,220 B2
(45) Date of Patent: Jan. 23, 2024

(54) DEVICE CONTROL METHOD, APPARATUS, AND SYSTEM

(71) Applicant: HUAWEI TECHNOLOGIES CO., LTD., Guangdong (CN)

(72) Inventor: Jihao Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/913,521

(22) PCT Filed: Mar. 15, 2021

(86) PCT No.: PCT/CN2021/080773
§ 371 (c)(1),
(2) Date: Sep. 22, 2022

(87) PCT Pub. No.: WO2021/190336
PCT Pub. Date: Sep. 30, 2021

(65) Prior Publication Data
US 2023/0108331 A1    Apr. 6, 2023

(30) Foreign Application Priority Data

Mar. 24, 2020 (CN) .................. 2020102117973.5

(51) Int. Cl.
*G06F 3/01* (2006.01)
*G06V 10/25* (2022.01)
(Continued)

(52) U.S. Cl.
CPC .............. *G06F 3/017* (2013.01); *G06V 10/25* (2022.01); *G06V 10/28* (2022.01); *G06V 10/762* (2022.01); *G06V 40/161* (2022.01)

(58) Field of Classification Search
CPC .......... G06F 3/017; G06F 18/00; G06F 3/011; G06V 10/25; G06V 10/762; G06V 40/161;
(Continued)

(56) References Cited

U.S. PATENT DOCUMENTS

2009/0324008 A1   12/2009   Kongqiao et al.
2013/0063345 A1    3/2013   Maeda
(Continued)

FOREIGN PATENT DOCUMENTS

CN    102375542 A    3/2012
CN    107493495 A   12/2017
(Continued)

OTHER PUBLICATIONS

Extended European Search Report in European Appln No. 21775512.3, dated Jun. 26, 2023, 10 pages.
(Continued)

*Primary Examiner* — Grant Sitta
(74) *Attorney, Agent, or Firm* — Fish & Richardson P.C.

(57) ABSTRACT

One example device control method includes: recognizing a collected environmental image; determining at least one to-be-recognized region in the environmental image; monitoring a target body part movement in the to-be-recognized region; if it is monitored that the target body part movement is consistent with a preset activation movement, tracking and monitoring a target body part movement in a target to-be-recognized region; or if it is monitored that the target body part movement in the target to-be-recognized region is a preset control movement, controlling a terminal device to perform a function operation corresponding to the control movement.

20 Claims, 9 Drawing Sheets

(51) Int. Cl.
*G06V 10/762* (2022.01)
*G06V 40/20* (2022.01)
*G06V 40/16* (2022.01)
*G06V 10/28* (2022.01)

(58) Field of Classification Search
CPC ...... G06V 40/28; G06V 40/16; G06V 40/103; G05B 2219/2642; G05B 15/02; G05B 19/418
See application file for complete search history.

(56) References Cited

U.S. PATENT DOCUMENTS

| | | | |
|---|---|---|---|
| 2013/0107026 A1 | 5/2013 | Kim | |
| 2013/0201104 A1* | 8/2013 | Ptucha | G06F 3/017 345/158 |
| 2014/0147035 A1* | 5/2014 | Ding | G06V 40/161 382/164 |
| 2014/0307955 A1* | 10/2014 | Liu | G06V 40/10 382/154 |
| 2016/0143582 A1 | 5/2016 | Connor | |
| 2020/0012351 A1 | 1/2020 | Zhao | |

FOREIGN PATENT DOCUMENTS

| | | |
|---|---|---|
| CN | 109145802 A | 1/2019 |
| CN | 109671136 A | 4/2019 |
| CN | 110139115 A | 8/2019 |
| CN | 110390693 A | 10/2019 |
| CN | 110598644 A | 12/2019 |
| CN | 110636383 A | 12/2019 |
| CN | 110673716 A | 1/2020 |
| CN | 110751046 A | 2/2020 |
| EP | 2605172 A3 | 7/2015 |

OTHER PUBLICATIONS

Office Action in Chinese Appln. No. 202010211797.5, dated Apr. 1, 2022, 15 pages (with English translation).

Office Action in Chinese Appln. No. 202010211797.5, dated Dec. 20, 2022, 6 pages.

International Search Report and Written Opinion in International Appln. No. PCT/CN2021/080773, dated Apr. 26, 2021, 16 pages (with English translation).

* cited by examiner

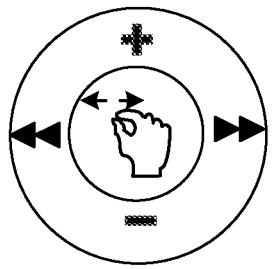
FIG. 10-a
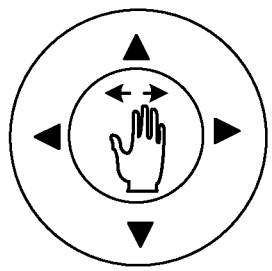
FIG. 10-b
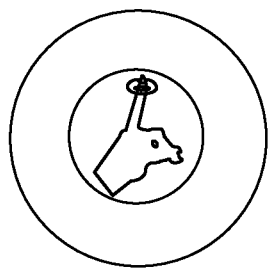
FIG. 10-c
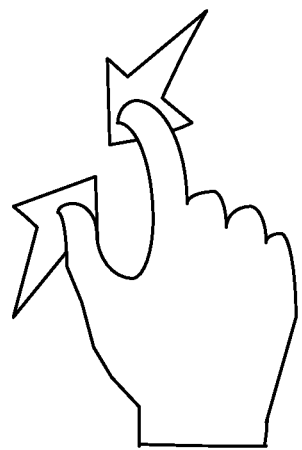
FIG. 11-a

FIG. 11-b
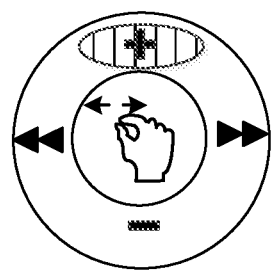
FIG. 11-c
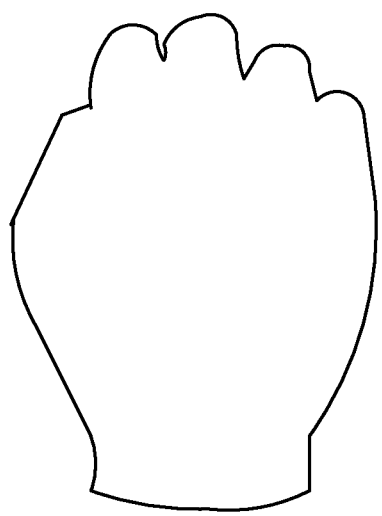
FIG. 12-a

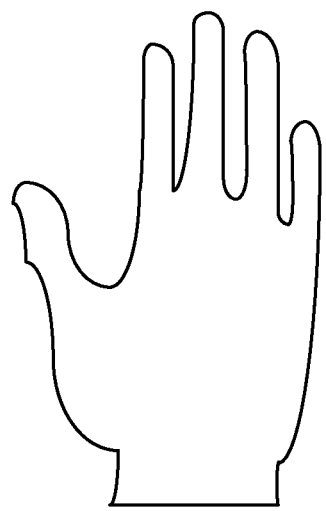
FIG. 12-b
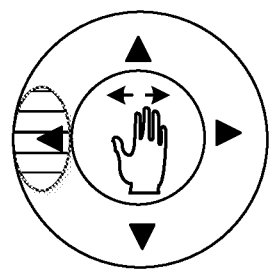
FIG. 12-c
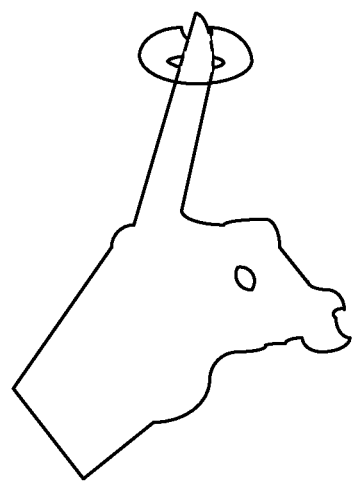
FIG. 13-a

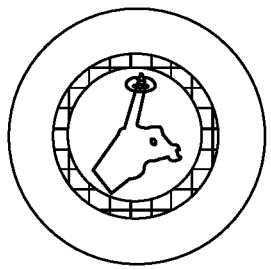
FIG. 13-b
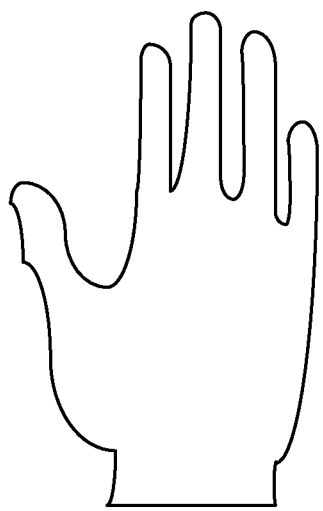
FIG. 14
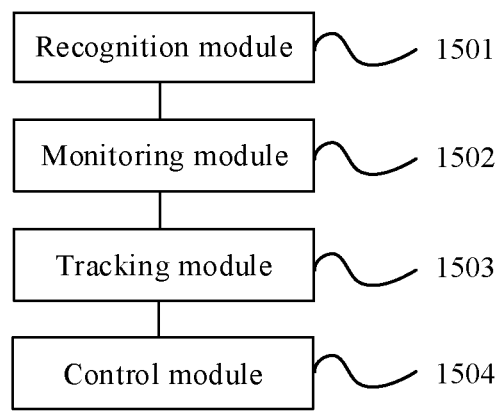
FIG. 15

DEVICE CONTROL METHOD, APPARATUS, AND SYSTEM

CROSS-REFERENCE TO RELATED APPLICATIONS

This application is a national stage of International Application No. PCT/CN2021/080773, filed on Mar. 15, 2021, which claims priority to Chinese Patent Application No. 202010211797.5, filed on Mar. 24, 2020. Both of the aforementioned applications are hereby incorporated by reference in their entireties.

TECHNICAL FIELD

This application relates to the field of smart home technologies, and in particular, to a device control method, apparatus, and system.

BACKGROUND

With continuous development of terminal devices, a user can control the terminal device by using an input device (such as a mouse, a keyboard, and a remote control), and can control the terminal device by using a triggered hand movement, so that the terminal device can perform a corresponding function operation based on the hand movement.

In a process of controlling the terminal device by using a hand movement, the terminal device may continuously collect a plurality of frames of user images, then identify a hand of the user in each frame of image, determine a movement category corresponding to a gesture of the user in each frame of image, predict, based on the movement category, a hand movement triggered by the user, and finally perform a corresponding function based on the determined movement.

However, in a process of recognizing the gesture of the user, the user may unconsciously trigger different gestures by mistake. In this case, the terminal device may detect the gesture triggered by the user by mistake, causing a high false drop rate of the terminal device.

SUMMARY

This application provides a device control method, apparatus, and system, to resolve a problem in the conventional technology that a false drop rate of a terminal device is relatively high.

To achieve the foregoing objective, this application uses the following technical solutions.

According to a first aspect, an embodiment of this application provides a device control method, including:

recognizing a collected environmental image, and determining at least one to-be-recognized region in the environmental image, where the to-be-recognized region includes a specified body part used to control a terminal device;

monitoring a target body part movement in the to-be-recognized region, wherein the target body part movement is a movement triggered by the specified body part;

if it is monitored that the target body part movement is consistent with a preset activation movement, tracking and monitoring a target body part movement in a target to-be-recognized region, where the target to-be-recognized region is a to-be-recognized region in which a target body part movement consistent with the activation movement is located; or if it is monitored that the target body part movement in the target to-be-recognized region is a preset control movement, controlling the terminal device to perform a function operation corresponding to the control movement.

In a first possible implementation of the first aspect, the recognizing a collected environmental image, and determining at least one to-be-recognized region in the environmental image includes:

collecting the environmental image;
recognizing a face region and a body region of each user in the environmental image; and
determining the at least one to-be-recognized region based on the plurality of face regions and the plurality of body regions.

According to the first possible implementation of the first aspect, in a second possible implementation of the first aspect, the determining the at least one to-be-recognized region based on the plurality of face regions and the plurality of body regions includes:

generating focus regions corresponding to the users based on the face region and the body region of the users for each user; and clustering the plurality of focus regions based on intersection over union between every two focus regions of the plurality of focus regions to obtain the at least one to-be-recognized region.

According to the second possible implementation of the first aspect, in a third possible implementation of the first aspect, the clustering the plurality of focus regions based on intersection over union between every two focus regions of the plurality of focus regions to obtain the at least one to-be-recognized region includes:

clustering the plurality of focus regions based on the intersection over union between every two focus regions of the plurality of focus regions to obtain at least one cluster, where the cluster includes at least one focus region, and if the cluster includes a plurality of focus regions, intersection over union between any focus region in the cluster and at least one another focus region in the cluster is greater than a preset intersection over union threshold;

determining a region boundary of each cluster based on a location of each focus region in each cluster in the environmental image; and generating, based on the region boundary of each cluster, the to-be-recognized region corresponding to each cluster.

In a fourth possible implementation of the first aspect, the activation movement includes a dynamic activation movement;

the monitoring a target body part movement in the to-be-recognized region includes:

if the target body part movement triggers movement switching, and the switching movement is consistent with the dynamic activation movement, determining that the target body part movement in the to-be-recognized region is consistent with the dynamic activation movement.

In a fifth possible implementation of the first aspect, the activation movement includes a static activation movement;

the monitoring a target body part movement in the to-be-recognized region includes:

if the target body part movement is consistent with the static activation movement and duration is longer than a preset time threshold, determining that the specified body part triggers the static activation movement.

According to any one of the first to the fifth possible implementations of the first aspect, in a sixth possible implementation of the first aspect, the monitoring a target body part movement in the to-be-recognized region includes:

obtaining an area of each to-be-recognized region; and monitoring, based on the area of each to-be-recognized region, a target body part movement in each to-be-recognized region in descending order of the area of each to-be-recognized region.

According to any one of the first to the fifth possible implementations of the first aspect, in a seventh possible implementation of the first aspect, the controlling the terminal device to perform a function operation corresponding to the control movement includes:

determining a function corresponding to the control movement;

generating a control instruction based on the function corresponding to the control movement; and sending the control instruction to the terminal device, wherein the control instruction instructs the terminal device to perform the function operation corresponding to the control movement.

According to any one of the first to the fifth possible implementations of the first aspect, in an eighth possible implementation of the first aspect, the method further includes:

sending an interface display instruction to the terminal device, where the interface display instruction instructs the terminal device to display a control interface.

According to a second aspect, an embodiment of this application provides a device control apparatus, including:

a recognition module, configured to: recognize a collected environmental image, and determine at least one to-be-recognized region in the environmental image, where the to-be-recognized region includes a specified body part used to control a terminal device;

a monitoring module, configured to monitor a target body part movement in the to-be-recognized region, where the target body part movement is a movement triggered by the specified body part;

a tracking module, configured to: if it is monitored that the target body part movement is consistent with a preset activation movement, track and monitor a target body part movement in a target to-be-recognized region, wherein the target to-be-recognized region is a to-be-recognized region in which a target body part movement consistent with the activation movement is located; and a control module, configured to: if it is monitored that the target body part movement in the target to-be-recognized region is a preset control movement, control the terminal device to perform a function operation corresponding to the control movement.

In a first possible implementation of the second aspect, the recognition module is specifically configured to: collect the environmental image, recognize a face region and a body region of each user in the environmental image, and determine the at least one to-be-recognized region based on the plurality of face regions and the plurality of body regions.

According to the first possible implementation of the second aspect, in a second possible implementation of the second aspect, the recognition module is further specifically configured to: generate focus regions corresponding to the users based on the face region and the body region of the user for each user; and cluster the plurality of focus regions based on intersection over union between every two focus regions of the plurality of focus regions to obtain the at least one to-be-recognized region.

According to the second possible implementation of the second aspect, in a third possible implementation of the second aspect, the recognition module is further specifically configured to: cluster the plurality of focus regions based on the intersection over union between every two focus regions of the plurality of focus regions to obtain at least one cluster, where the cluster includes at least one focus region, and if the cluster includes a plurality of focus regions, intersection over union between any focus region in the cluster and at least one another focus region in the cluster is greater than a preset intersection over union threshold; determine a region boundary of each cluster based on a location of each focus region in each cluster in the environmental image; and generate, based on the region boundary of each cluster, the to-be-recognized region corresponding to each cluster.

In a fourth possible implementation of the second aspect, the activation movement includes a dynamic activation movement;

and the monitoring module is specifically configured to: if the target body part movement triggers movement switching, and the switching movement is consistent with the dynamic activation movement, determine that the target body part movement in the to-be-recognized region is consistent with the dynamic activation movement.

In a fifth possible implementation of the second aspect, the activation movement includes a static activation movement;

and the monitoring module is specifically configured to: if the target body part movement is consistent with the static activation movement and duration is longer than a preset time threshold, determine that the specified body part triggers the static activation movement.

According to any one of the first to the fifth possible implementations of the second aspect, in a sixth possible implementation of the second aspect, the monitoring module is specifically configured to: obtain an area of each to-be-recognized region; and monitoring, based on the area of each to-be-recognized region, a target body part movement in each to-be-recognized region in descending order of the area of each to-be-recognized region.

According to any one of the first to the fifth possible implementations of the second aspect, in a seventh possible implementation of the second aspect, the control module is specifically configured to: determine a function corresponding to the control movement; generate a control instruction based on the function corresponding to the control movement; and send the control instruction to the terminal device, where the control instruction instructs the terminal device to perform the function operation corresponding to the control movement.

According to any one of the first to the fifth possible implementations of the second aspect, in an eighth possible implementation of the second aspect, the apparatus further includes:

a sending module, configured to send an interface display instruction to the terminal device, where the interface display instruction instructs the terminal device to display a control interface.

According to a third aspect, an embodiment of this application provides a device control system, where the device control system includes: an image collection device and a terminal device, and the image collection device is connected to the terminal device;

the image collection device is configured to: recognize a collected environmental image, and determine at least one to-be-recognized region in the environmental image, where the to-be-recognized region includes a specified body part used to control a terminal device;

the image collection device is further configured to monitor a target body part movement in the to-be-recognized region, where the target body part movement is a movement triggered by the specified body part;

if it is monitored that the target body part movement is consistent with preset activation movement, the image collection device is further configured to track and monitor a target body part movement in a target to-be-recognized region, where the target to-be-recognized region is a to-be-recognized region in which a target body part movement consistent with the activation movement is located; or if it is monitored that the target body part movement in the target to-be-recognized region is a preset control movement, the image collection device is further configured to control the terminal device to perform a function operation corresponding to the control movement; and the terminal device is configured to perform a function operation corresponding to the control movement.

According to a fourth aspect, an embodiment of this application provides an image collection device, including: a memory, a processor, and a computer program that is stored in the memory and that can be run on the processor. When executing the computer program, the processor implements the device control method according to any one of the first aspect.

According to a fifth aspect, an embodiment of this application provides a computer-readable storage medium. The computer-readable storage medium stores a computer program. When the computer program is executed by a processor, the processor implements the device control method according to any one of the first aspect.

According to a sixth aspect, an embodiment of this application provides a computer program product. When the computer program product is run on a terminal device, the terminal device performs the device control method according to any one of the first aspect.

According to the device control method, apparatus, and system provided in this application, a to-be-recognized region in an environmental image is determined, and a target body part movement triggered by a specified body part in the to-be-recognized region is monitored. If it is monitored that the target body part movement is consistent with an activation movement, whether the target body part movement triggered by the specified body part is consistent with a preset control movement may continue to be monitored, so that when the target body part movement is consistent with the control movement, a terminal device can be controlled to perform a function operation that matches the control movement, whether a user needs to control the terminal device is determined by monitoring whether the target body part movement is consistent with the activation movement, and if the target body part movement is consistent with the activation movement, whether the target body part movement is consistent with the control movement is further monitored, to control the terminal device based on the target body part movement consistent with the control movement. In this way, the terminal device is controlled by using a target body part movement including two-stage movements. This reduces a probability that the user controls the terminal device by merely triggering one target body part movement, reduces a false drop rate of monitoring the triggered movement by the image collection device, and improves accuracy of controlling the terminal device by the image collection device based on the movement triggered by the user.

BRIEF DESCRIPTION OF DRAWINGS

FIG. 10-a is a schematic diagram of an interface displayed by a terminal device according to an embodiment of this application;

FIG. 10-b is a schematic diagram of another interface displayed by a terminal device according to an embodiment of this application;

FIG. 10-c is a schematic diagram of still another interface displayed by a terminal device according to an embodiment of this application;

FIG. 11-a is a schematic diagram of a target body part movement triggered by a hand according to an embodiment of this application;

FIG. 11-b is a schematic diagram of another target body part movement triggered by a hand according to an embodiment of this application;

FIG. 11-c is a schematic diagram of yet another interface displayed by a terminal device according to an embodiment of this application;

FIG. 12-a is a schematic diagram of a target body part movement triggered by a hand according to an embodiment of this application;

FIG. 12-b is a schematic diagram of another target body part movement triggered by a hand according to an embodiment of this application;

FIG. 12-c is a schematic diagram of still yet another interface displayed by a terminal device according to an embodiment of this application;

FIG. 13-a is a schematic diagram of a target body part movement triggered by a hand according to an embodiment of this application;

FIG. 13-b is a schematic diagram of a further interface displayed by a terminal device according to an embodiment of this application;

FIG. 14 is a schematic diagram of a target body part movement triggered by a hand according to an embodiment of this application;

FIG. 15 is a block diagram of a structure of a device control apparatus according to an embodiment of this application.

DESCRIPTION OF EMBODIMENTS

Figure 1:
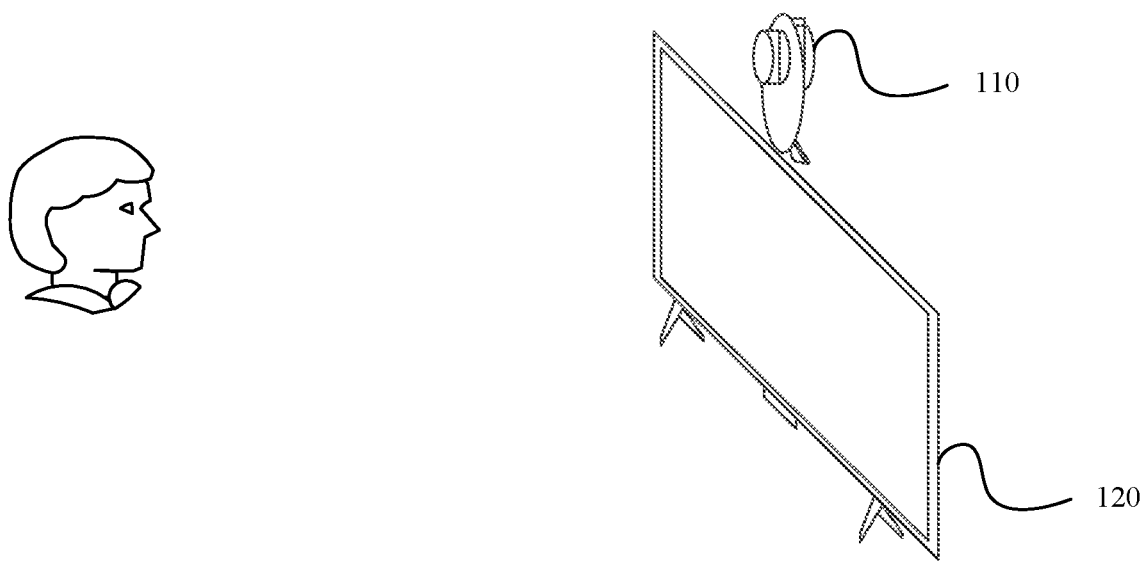
FIG. 1 is a schematic diagram of an architecture of a device control system in a device control method according to an embodiment of this application.

In the following description, to illustrate rather than limit, specific details such as a particular system structure, and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "I" generally indicates an "or" relationship between the associated objects.

A device control method provided in embodiments of this application may be applied to a terminal device such as a tablet computer, a wearable device, a vehicle-mounted device, an augmented reality (augmented reality, AR)/virtual reality (virtual reality, VR) device, or a notebook computer. A specific type of the terminal device is not limited in embodiments of this application.

For example, the terminal device may be a station (STATION, ST) in a WLAN, or may be a vehicle-mounted device, a vehicle-to-everything terminal, a laptop computer, a set top box (set top box, STB), or the like.

As an example rather than a limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not only a hardware device, but also implements a powerful function via software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

FIG. 1 is a schematic diagram of an architecture of a device control system in a device control method according to an embodiment of this application. As an example rather than a limitation, refer to FIG. 1. The device control system may include: an image collection device 110 and a terminal device 120. The image collection device 110 is connected to the terminal device 120.

The image collection device may include a central processing unit (Central Processing Unit, CPU) and a neural processing unit (Neural Processing Unit, NPU). For example, the image collection device may be a camera.

For ease of description, embodiments of this application are described by using an example in which the terminal device is a smart television. In actual application, the terminal device may alternatively be another type of electronic device that has a data receiving, sending, and processing capability and a playing capability. The terminal device is not limited in embodiments of this application.

If the terminal device is a smart television, in a process of watching content played by the smart television, a user may control, by performing different movements, the smart television to perform different function operations, to implement different functions. For example, the smart television may adjust a volume, a playing progress, and a playing channel based on a movement triggered by the user.

In a process in which the smart television implements the different functions based on an operation triggered by the user, the image collection device may first photograph an environment in which the smart television is currently located, collect an environmental image of the user in front of a screen of the smart television, recognize the user in the environmental image by using an NPU of the image collection device, and determine a region in which a human body is located; and then identify a key point (for example, a hand) of the human body, and send a recognition result to a CPU of the image collection device, so that the CPU of the image collection device can check whether the user triggers a preset activation movement or control movement. If the user triggers the activation movement or the control movement, a display instruction or a control instruction may be generated, and the display instruction or the control instruction is sent to the smart television. In this case, the smart television may display, according to the display instruction, a control interface used to control the smart television, or perform a corresponding function operation according to the control instruction, to implement a corresponding function.

The activation movement is used to activate the image collection device to continuously collect target body part movements triggered by the user, so that the image collection device may determine, according to the continuously collected target body part movement, whether the user triggers a control movement, to generate a control instruction according to the triggered control movement, and further implement control on the smart television by using the control instruction.

The display instruction is generated when the image collection device determines that the target body part movement triggered by the user is consistent with the activation movement, and is used to control the smart television to display the control interface, so that the user can continue to trigger the target body part movement consistent with the preset control operation based on content displayed on the control interface, to control the smart television to implement the different functions.

It should be noted that, in actual application, the image collection device and the terminal device may be disposed separately, for example, a camera and a smart television, and the camera and the smart television are connected through a data cable. Alternatively, the image collection device and the terminal device may be integrated, for example, a mobile phone and a camera disposed inside the mobile phone. A manner of disposing the image collection device and the terminal device is not limited in embodiments of this application.

In addition, in a process of disposing the image collection device and the terminal device, the image collection device and the terminal device may face a same direction, that is, a direction towards which a screen of the terminal device faces is consistent with a direction in which the image collection device collects an image. For example, a screen of the smart television faces a sofa, and the user may sit on the sofa to watch content played by the smart television. In this case, the image collection device also faces the sofa, so that image collection may be performed on a region in which the sofa is located, to obtain an environmental image including the user.

Figure 2:
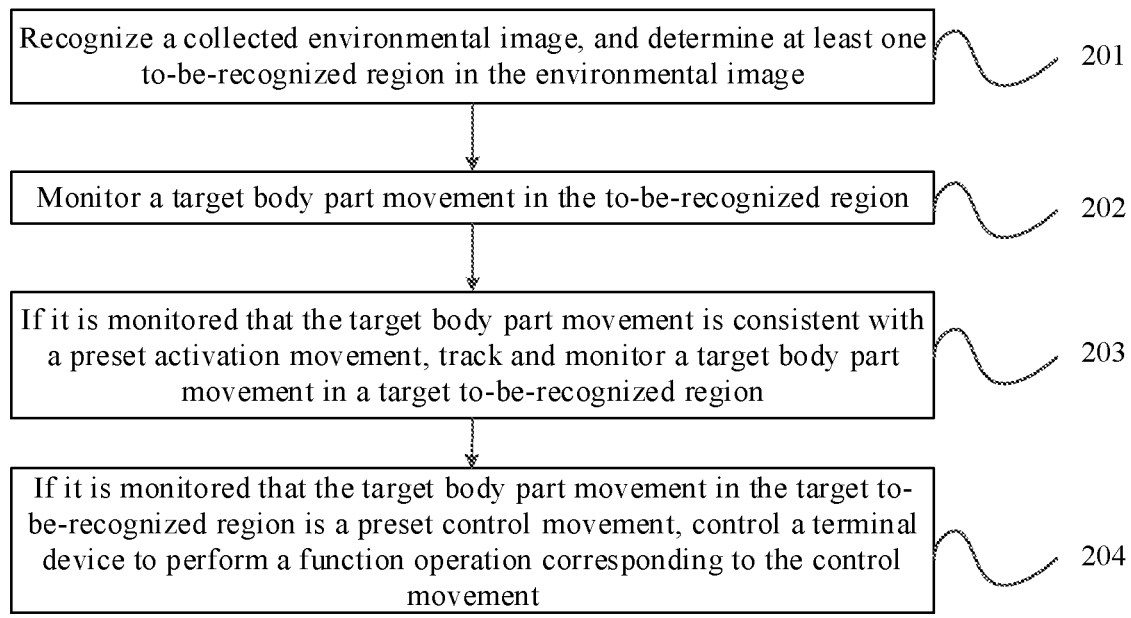
FIG. 2 is a schematic flowchart of a device control method according to an embodiment of this application.

FIG. 2 is a schematic flowchart of a device control method according to an embodiment of this application. As an example rather than a limitation, the method may be applied to the foregoing image collection device. Refer to FIG. 2. The method includes the following steps.

Step 201: Recognize a collected environmental image, and determine at least one to-be-recognized region in the environmental image.

The to-be-recognized region includes a specified body part used to control a terminal device. For example, an image collection device may control, based on a hand movement of a user, the terminal device to perform different operations, to implement different functions. Correspondingly, a hand that triggers the gesture may be used as the specified body part of the user.

The terminal device may display different playing content to the user, and the user may be located in front of a screen of the terminal device to view the content played by the terminal device. The image collection device connected to the terminal device may collect environmental images in a current scenario including the user, generate different control instructions based on different movements triggered by the user in the environmental images, and send the control instructions to the terminal device, so that the terminal device performs the different functions, to control the terminal device by using the movements triggered by the user.

Specifically, after collecting the environmental image, the image collection device may first recognize the environmental image to determine a region in which the user is located in the environmental image, and recognize the specified body part of the user to obtain the to-be-recognized region. There may be a plurality of users in the current scenario, and the image collection device may recognize at least one to-be-recognized region.

In a possible implementation, the image collection device may separately determine, via human body recognition and facial recognition, a body region in which a human body is located and a face region in which a face is located in the environmental image, and then combine the body region and the face region to obtain the at least one to-be-recognized region.

Figure 3:
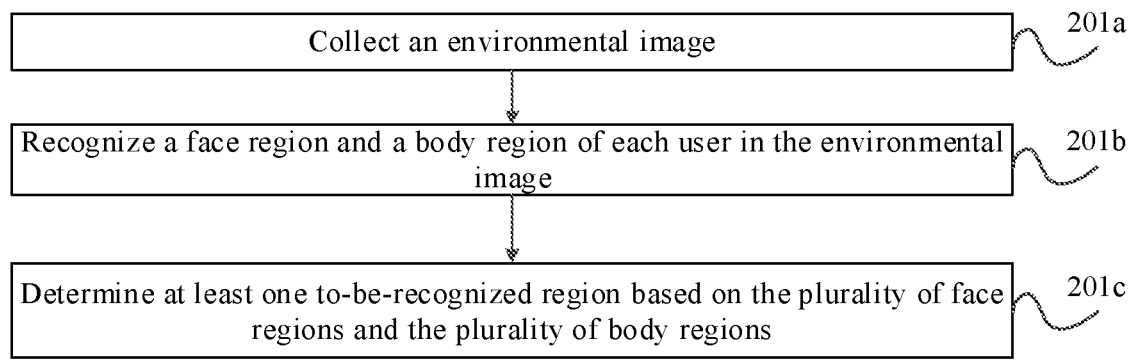
FIG. 3 is a schematic flowchart of determining a to-be-recognized region according to an embodiment of this application.

Refer to FIG. 3. Optionally, step 201 may include step 201a, step 201b, and step 201c.

Step 201a: Collect an environmental image.

Before recognizing the environmental image, an image collection device may first detect whether a terminal device starts displaying playing content to a user. If the image collection device detects that the terminal device starts displaying the playing content, the image collection device may start collecting the environmental image, to recognize the collected environmental image in a subsequent step.

It should be noted that the image collection device may continuously collect video stream data, and extract image frames from the video stream data at a preset time interval, to obtain a plurality of environmental images. Alternatively, the image collection device may periodically perform photographing, to obtain a plurality of environmental images.

Step 201b: Recognize a face region and a body region of each user in the environmental image.

After collecting the environmental image, the image collection device may separately recognize a face and a human body in the environmental image according to a preset detection algorithm, determine regions in which the face and the body of the user are located, and expand the determined regions based on an expansion ratio, to obtain the face region and the body region.

In a possible implementation, the image collection device may recognize the face in the environmental image according to a preset facial recognition algorithm by collecting key points of facial features, and determine, according to a preset human body recognition algorithm by using a detected body contour, a region in which the body of the user is located.

Further, in a watching process of the user, locations of some body parts may change with movements performed by the user. Therefore, in a process of determining a to-be-recognized region, recognized regions may be expanded, according to the preset expansion ratio, for the region in which the face is located and the region in which the body is located, to obtain the face region and the body region.

Figure 4:
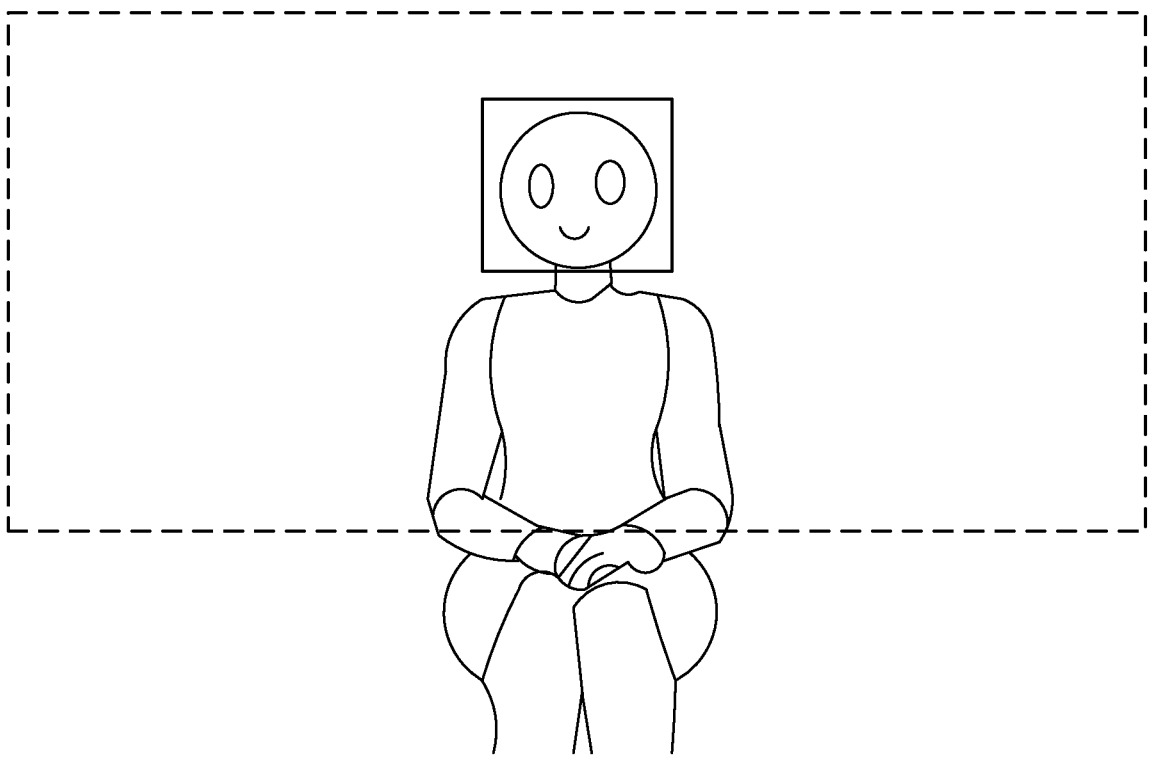
FIG. 4 is a schematic diagram of a face region in an environmental image according to an embodiment of this application.
Figure 5:
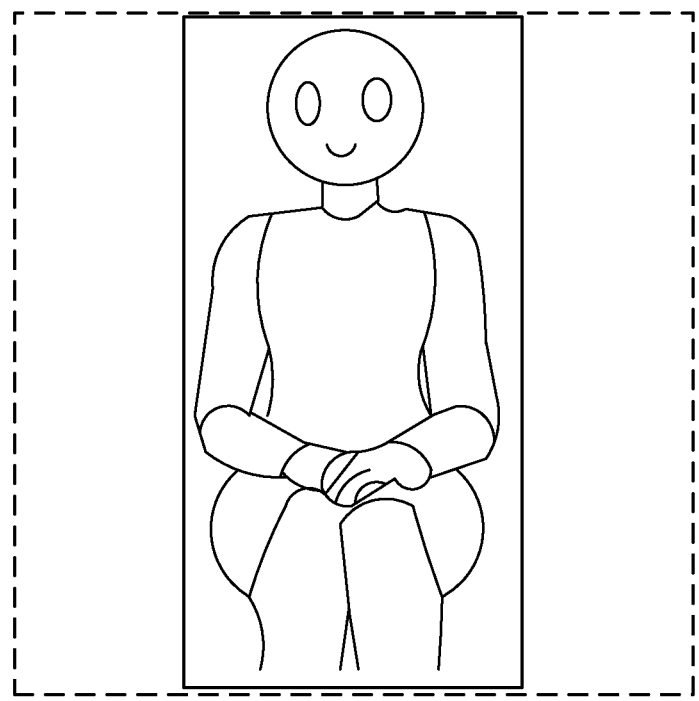
FIG. 5 is a schematic diagram of a body region in an environmental image according to an embodiment of this application.

Refer to FIG. 4 and FIG. 5. For example, FIG. 4 shows a recognized region in which a face is located and a face region obtained after expansion, and FIG. 5 shows a recognized region in which a body is located and a body region obtained after expansion. If a preset face expansion ratio is 0.5:1.5:2.5:2.5, after the region (a region corresponding to a solid line part) in which the face is located in FIG. 4 is recognized, based on a height of the region in which the face is located, expand an upper side of the region by 0.5 times of height, expand the lower side of the region by 1.5 times of height, and then expand left and right sides of the region by 2.5 times of width based on a width of the region in which the face is located, to obtain the face region shown by a dotted line part.

Similarly, if a preset body expansion ratio is 0:0:0.5:0.5, after a region (a region corresponding to a solid line part) in which the body is located in FIG. 5 is recognized, the region may be separately expanded by 0.5 times to left and right sides of the region based on a width of the region in which the body is located, to obtain the body region shown by a dotted line part.

Certainly, the face expansion ratio may alternatively be 1:4:3.2:3.2 or a ratio corresponding to another parameter, and the body expansion ratio may alternatively be 0.5:0.5:0.5:0.5 or a ratio corresponding to another parameter. The face expansion ratio and the body expansion ratio are not limited in this embodiment of this application.

It should be noted that, in actual application, a plurality of users may simultaneously watch the content played by the terminal device, and face regions and body regions of the plurality of users may be recognized in the foregoing manner. In embodiments of this application, that a face region and a body region of one user are recognized is merely used as an example for description, and the face region and the body region of each user may be recognized in a similar manner. A quantity of the users in the environmental image is not limited in embodiments of this application.

In addition, whether a face region and a body region belong to a same user may be determined based on a location relationship between the face region and the body region. For example, if a user sits in front of the terminal device, a longitudinal central axis of a face region may coincide with a longitudinal central axis of a body region, and the face region is located above the body region.

Step 201c: Determine at least one to-be-recognized region based on the plurality of face regions and the plurality of body regions.

After recognizing the face region and the body region of each user, the image collection device may determine, based on the face region and the body region corresponding to each user, a focus region corresponding to each user, and then cluster the focus region to obtain the at least one to-be-recognized region.

Optionally the image collection device may generate the focus regions corresponding to the users based on the face region and the body region of the user for each user, and then cluster the plurality of focus regions based on intersection over union between every two focus regions of the plurality of focus regions to obtain the at least one to-be-recognized region.

In a possible implementation, the image collection device may first determine a face region and a body region corresponding to a same user from the plurality of face regions and body regions, and display the face region and the body region of the user in a same environmental image, so that the face region and the body region have an overlapping part. Therefore, an overlapping region between the face region and the body region may be used as the focus region corresponding to the user, and the face region and the body region of each user may overlap in the foregoing manner, to obtain the focus region of each user.

In actual application, in a process in which the plurality of users watch the content played by the terminal device, the plurality of users may gather in a same region. For example, in a process in which the plurality of users watch a television, the plurality of users usually sit on a sofa in front of the television, and recognized focus regions of the plurality of users may overlap. In this embodiment, the focus regions are clustered based on intersection over union between the focus regions to obtain at least one to-be-recognized region, to reduce recognition workload of the image collection device.

During specific implementation, the image collection device may cluster the plurality of focus regions based on the intersection over union between every two focus regions in the plurality of focus regions to obtain at least one cluster, determine a region boundary of each cluster based on a location of each focus region in each cluster in the environmental image, and then generate, based on the region boundary of each cluster, the to-be-recognized region corresponding to each cluster.

The cluster may include at least one focus region. If the cluster includes a plurality of focus regions, intersection over union between any focus region in the cluster and at least one other focus region in the cluster is greater than a preset intersection over union threshold.

For example, a specific cluster includes three focus regions: a first focus region, a second focus region, and a third focus region. Intersection over union between the first focus region and the second focus region is greater than an intersection over union threshold, and intersection over union between the second focus region and the third focus region is greater than the intersection over union threshold. However, intersection over union between the first focus region and the third focus region may be less than or equal to the intersection over union threshold.

In a possible implementation, the image collection device may select a first focus region and a second focus region from the plurality of focus regions, and then perform calculation based on an area of an overlapping region between the first focus region and the second focus region and an area of a combined region of the first focus region and the second focus region, to obtain intersection over union between the first focus region and the second focus region. If the intersection over union is greater than the preset intersection over union threshold, it indicates that the first focus region and the second focus region have a relatively large overlapping part, and the first focus region and the second focus region may be clustered into one category. After each focus region is calculated in the foregoing manner, the intersection over union between every two focus regions in the plurality of focus regions may be obtained, so that the at least one focus region may be clustered based on the intersection over union to generate the at least one to-be-recognized region.

Further, in a process of clustering the first focus region and the second focus region into one type to generate the to-be-recognized region, location information (for example, information about four boundaries, namely, upper, lower, left, and right boundaries) of the first focus region and the second focus region in the environmental image may be separately obtained, and then each piece of maximum/minimum boundary information with a maximum parameter value or a minimum parameter value is selected from the location information based on parameter values corresponding to the location information, a location indicated by each piece of maximum/minimum boundary information is used as a region boundary of a cluster in which the first focus region and the second focus region are located, and finally, a to-be-recognized region based on the cluster may be generated based on the location indicated by each piece of maximum/minimum boundary information.

Figure 6:
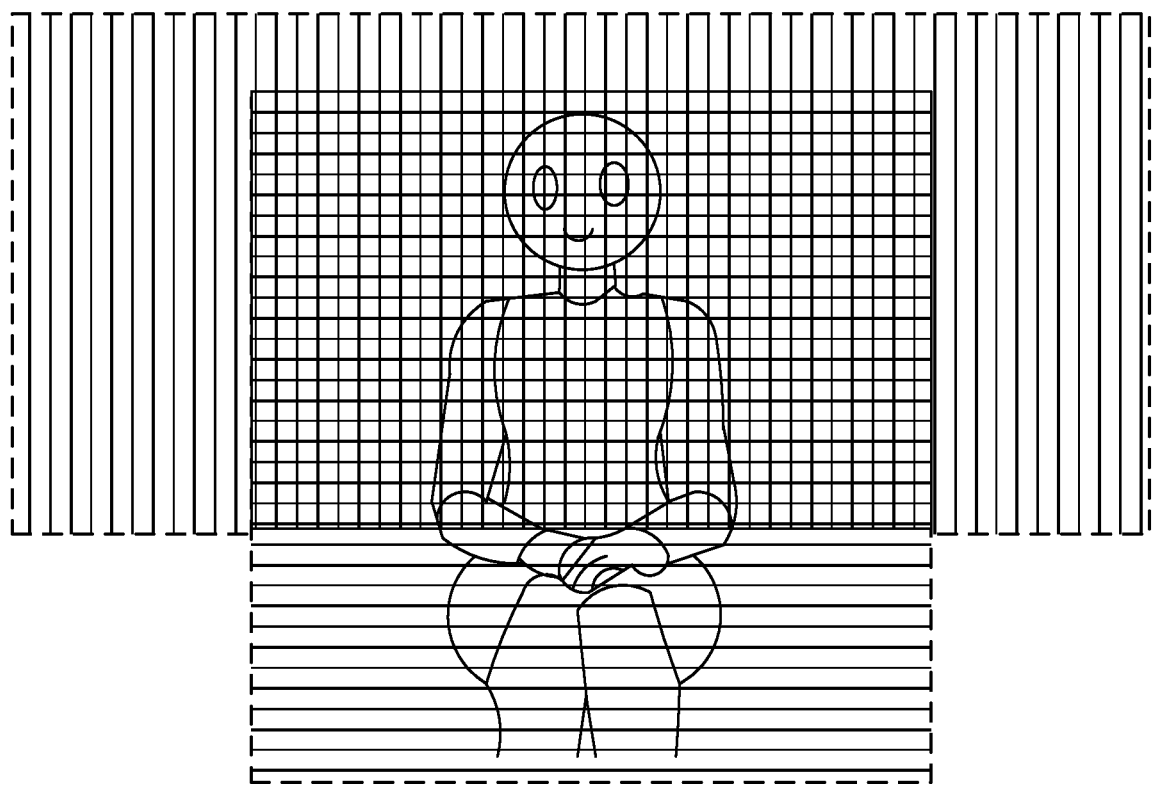
FIG. 6 is a schematic diagram of a focus region in an environmental image according to an embodiment of this application.

Refer to FIG. 6. For example, FIG. 6 shows a recognized face region and a recognized body region of a user. As shown in FIG. 6, a rectangular frame of a horizontal stripe is the face region of the user, and a rectangular frame of a vertical stripe is the body region of the user. After the face region and the body region are overlapped, an overlapping part of the horizontal stripe and the vertical stripe is obtained, that is, a focus region of the user.

Figure 7:
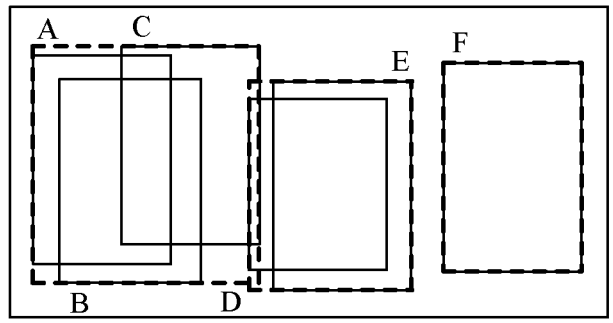
FIG. 7 is a schematic diagram of a plurality of focus regions in an environmental image according to an embodiment of this application.

Refer to FIG. 7. FIG. 7 shows focus regions respectively corresponding to a plurality of users. As shown in FIG. 7, the figure includes focus regions (regions corresponding to solid-line borders) respectively corresponding to the plurality of users that are recognized by an image collection device. After the image collection device calculates intersection over union between the focus regions, if a parameter value of intersection over union between any two focus regions is greater than a preset intersection over union threshold 0.5, it is determined that the two focus regions may be clustered, to obtain a to-be-recognized region shown by a dashed line in the figure.

Further, in a clustering process, as shown in FIG. 7, an environmental image may include six focus regions A, B, C, D, E, and F, where A, B, and C may be clustered, D and E may be clustered, and F is independently used as a to-be-recognized region. In this case, a left boundary of A may be used as a left region boundary of a cluster in which A is located, and a lower boundary of B may be used as a lower region boundary of the cluster in which B is located, then, an upper boundary and a right boundary of C are respectively used as an upper region boundary and a right region boundary of the cluster in which C is located. Similarly, a left boundary of D may be used as a left region boundary of a cluster in which D is located, and boundaries in three directions of E: an upper region boundary, a lower region boundary, and a right region boundary of E may be respectively used as an upper region boundary, a lower region boundary, and a right region boundary of the cluster in which E is located. F is independently used as a to-be-recognized region, and each boundary of F is used as a region boundary of the to-be-recognized region corresponding to F. Therefore, a plurality of to-be-recognized regions obtained after clustering shown in FIG. 8 may be obtained.

It should be noted that this embodiment of this application is described merely by using an example in which a face region and a body region of each user are first recognized, and then the face region and the body region corresponding to each user are separately overlapped to obtain a focus region of each user. However, in actual application, after recognizing a face region and a body region of a user, the image collection device may determine, based on the face region and the body region, a focus region corresponding to the user. A manner of determining the focus region is not limited in this embodiment of this application.

Step 202: Monitor a target body part movement in the to-be-recognized region The target body part movement is a movement triggered by the specified body part. For example, if the specified body part is a hand of the user, the target body part movement may be at least one postural movement triggered by the hand, for example, a postural movement such as finger pinching or palm opening.

After recognizing the to-be-recognized region, the image collection device may recognize the target body part movement triggered by the specified body part in the to-be-recognized region, so that in a subsequent step, the image collection device may control the terminal device based on the recognized target body part movement to perform a corresponding operation, to implement a matching function.

Figure 9:
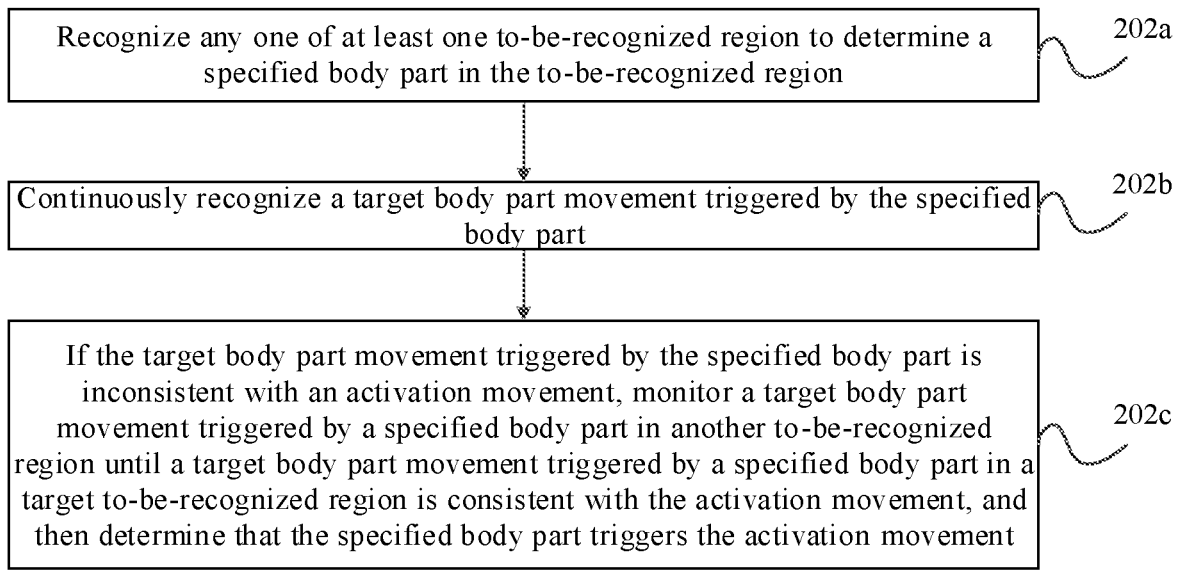
FIG. 9 is a schematic flowchart of monitoring a target body part movement according to an embodiment of this application.

In a process of monitoring the specified body part, the image recognition device may first recognize the specified body part, and then monitor the identified specified body part. Refer to FIG. 9. Step 202 may include step 202*a*, step 202*b*, step 202*c*, and step 202*d*.

Step 202*a*: Recognize any one of at least one to-be-recognized region to determine a specified body part in the to-be-recognized region.

After determining each to-be-recognized region, the image collection device may recognize the specified body part in each to-be-recognized region, to monitor the movement triggered by the specified body part, so that in a subsequent step, the image collection device may recognize the target body part movement triggered by the specified body part.

For example, if the specified body part is a hand, the image collection device may recognize the hand in each to-be-recognized region according to a preset algorithm by using a neural network processing unit, and determine a location of the hand of the user based on human body key point information, to recognize a region in which the hand is located in the to-be-recognized region.

It should be noted that, in actual application, the to-be-recognized region may include focus regions corresponding to a plurality of users. In this case, in a process of recognizing the specified body part, a plurality of specified body parts may be recognized in a same to-be-recognized region. A quantity of specified body parts recognized in the to-be-recognized region is not limited in this embodiment of this application.

Step 202*b*: Continuously recognize a target body part movement triggered by the specified body part.

The image collection device may determine, based on environmental images continuously collected in step 201*b*, a specified body part recognized from each environmental image, and recognize, based on postures of the specified body part in different environmental images, a target body part movement triggered by the specified body part, so that in a subsequent step, the image collection device can determine whether the triggered target body part movement is consistent with a preset activation movement, and may perform different operations based on determining results in the subsequent step.

Activation movements may include a dynamic activation movement and a static activation movement. For example, the dynamic activation movement may be that the hand switches from a posture to another posture within preset duration, for example, the finger switches from a separate posture to a pinch posture, or switches from a first holding posture to a palm opening posture. The static activation movement may be that the hand keeps a posture unchanged within preset duration.

In a possible implementation, the image collection device may select image frames within a preset duration for the environmental images that are continuously collected, recognize a posture of the specified body part in each selected frame of environmental image by using the NPU, and then determine, based on each recognized posture, the target body part movement triggered by the specified body part.

Step 202*c*: If the target body part movement triggered by the specified body part is inconsistent with an activation movement, monitor a target body part movement triggered by a specified body part in another to-be-recognized region until a target body part movement triggered by a specified body part in a target to-be-recognized region is consistent with the activation movement, and then determine that the specified body part triggers the activation movement.

The image collection device may compare the recognized target body part movement with the preset activation movement, to determine whether the target body part movement is consistent with the activation movement, so that the image collection device may determine, based on a determining result, whether a target body part movement in a next to-be-recognized region needs to be monitored.

If a target body part movement in a current to-be-recognized region is inconsistent with the activation movement, a target body part movement in the next to-be-recognized region may be monitored. If the target body part movement in the current to-be-recognized region is consistent with the activation movement, it indicates that the user expects to control the terminal device to adjust content played by the terminal device. In this case, it may be determined that the specified body part of the user triggers the activation movement.

As described above, the activation movements may include the dynamic activation movement and the static activation movement. For different activation movements, the image collection device may determine, in different manners, whether the user triggers the activation movement. For example, if the target body part movement triggers movement switching, and the switching movement is consistent with the dynamic activation movement, the image collection device may determine that the specified body part in the to-be-recognized region is consistent with the dynamic activation movement.

For the dynamic activation movement, in a process of determining whether the specified body part triggers the activation movement, the image collection device may first recognize a specified body part in a first frame of environmental image to determine a posture of the specified body part, then recognize the specified body part in a second frame of environmental image to re-determine a posture of the specified body part, and then compare postures of the specified body part in the two image frames to determine whether the recognized two postures are switched, if movement switching occurs, the image collection device may continue to compare the two recognized postures with a pre-stored dynamic activation movement, to determine whether the target body part movement triggered by the specified body part is consistent with the dynamic activation movement. If the target body part movement is consistent with the dynamic activation movement, it may be determined that the specified body part triggers the activation movement.

For the static activation movement, the image collection device may also first continuously recognize a target body part movement triggered by a specified body part, and then separately recognize postures of the specified body part in a first frame of environmental image and a second frame of environmental image. If the two recognized postures are the same, and a time interval between the first frame of environmental image and the second frame of environmental image is greater than a preset time threshold, that is, if the target body part movement is consistent with the static activation movement, and the duration is greater than the preset time threshold, it may be determined that the specified body part triggers the static activation movement.

However, if it is determined that the specified body part does not trigger the static activation movement, it indicates that the user in the current to-be-recognized region does not trigger the activation movement. In this case, a next to-be-recognized region in the environmental image may be monitored, to monitor another to-be-recognized region.

It should be noted that, in this embodiment of this application, only two frames of environmental images in total of the first frame of environmental image and the second frame of environmental image are used as an example for description. However, in actual application, a triggered target body part movement may be recognized by using three frames of environmental images, five frames of environmental images, or another quantity of environmental images. This is not limited in this embodiment of this application.

In addition, in a process of monitoring each to-be-recognized region, the image collection device may first obtain an area of each to-be-recognized region, and then monitor, based on the area of each to-be-recognized region, a target body part movement triggered by the specified body part in each to-be-recognized region in descending order of the area of each to-be-recognized region.

Figure 8:
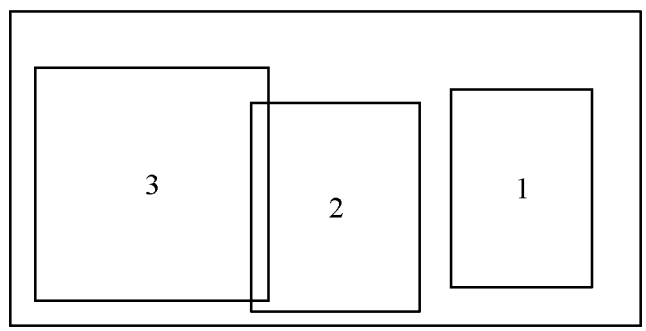
FIG. 8 is a schematic diagram of to-be-recognized regions in an environmental image according to an embodiment of this application.

For example, the image collection device recognizes a plurality of to-be-recognized regions shown in FIG. 8. Each to-be-recognized region has a different area size. It indicates that a distance between a user and a terminal device in each to-be-recognized region is different. A larger area indicates a smaller distance between the user and the terminal device. If an area corresponding to a to-be-recognized region 1 is 1, an area corresponding to a to-be-recognized region 2 is 2, and an area corresponding to a to-be-recognized region 3 is 3, the image collection device may first monitor the to-be-recognized region 3. If a triggered activation movement is not recognized, the image collection device may then monitor the to-be-recognized region 2. If a triggered activation movement is monitored in the to-be-recognized region 2, step 203 may be performed. If a triggered activation movement is not monitored in the to-be-recognized region 2, the image collection device may then monitor the to-be-recognized region 1.

It should be noted that, in actual application, if a triggered activation movement is still not monitored after each to-be-recognized region is monitored, at least one frame of environmental image may be further obtained, and the re-obtained environmental image is monitored until a to-be-recognized region that triggers the activation movement is monitored.

Step 203: If it is monitored that the target body part movement is consistent with the preset activation movement, track and monitor the target body part movement in the target to-be-recognized region.

The target to-be-recognized region is a to-be-recognized region in which a target body part movement consistent with the activation movement is located.

If the image collection device determines that a target body part movement triggered by a user in a specific to-be-recognized region is the preset activation movement, the image collection device may use the to-be-recognized region as the target to-be-recognized region, and track the target to-be-recognized region, to monitor a target body part movement that the user continues to trigger in the target to-be-recognized region, so that in a subsequent step, the image collection device may control the terminal device to perform a corresponding operation based on the tracked and monitored target body part movement.

For example, based on the example in step 202*d*, if it is monitored, in the to-be-recognized region 2, that a target body part movement triggered by a user is the activation movement, the to-be-recognized region 2 may be used as the target to-be-recognized region.

It should be noted that, after determining that the target body part movement triggered by the user is the activation movement, the image collection device may send an interface display instruction to the terminal device. The interface display instruction instructs the terminal device to display a control interface, to remind the user that the activation movement has been triggered currently and that a target body part movement consistent with a control movement may continue to be triggered, to control the terminal device.

For example, a terminal device may display interfaces shown in FIG. 10-*a* to FIG. 10-*c*. FIG. 10-*a* shows an interface for reminding a user to adjust a volume and a playback progress of the terminal device. FIG. 10-*b* shows an interface for reminding the user to switch a playback channel of the terminal device. FIG. 10-*c* shows an interface for reminding the user to mute the terminal device.

Step 204: If it is monitored that the target body part movement in the target to-be-recognized region is a preset control movement, control the terminal device to perform a function operation corresponding to the control movement.

After determining the target to-be-recognized region, the image collection device may further recognize a target body part movement triggered by a specified body part in the target to-be-recognized region. If it is monitored that the triggered target body part movement is the control movement, the image collection device may generate a corresponding control instruction and sent the instruction to the terminal device, to control the terminal device to perform, based on the control instruction, the function operation corresponding to the control movement.

In a possible implementation, the image collection device may continuously monitor the specified body part in the target to-be-recognized region based on continuously obtained environmental images, and determine, based on a change in a posture of the specified body part, whether the target body part movement triggered by the specified body part matches the preset control movement, to determine, based on a determining result, whether the user triggers the control movement.

If the control movement is triggered, the image collection device may first determine, based on the matched preset control movement, a function corresponding to the target body part movement triggered by the specified body part, generate the control instruction based on the function corresponding to the control movement, and then send the control instruction to the terminal device. The control instruction may instruct the terminal device to perform the function operation corresponding to the control movement.

It should be noted that, in a process of performing a movement according to the control instruction, the terminal device may further display, according to the control instruction and on a basis of any interface in FIG. 10-a to FIG. 10-c, an option corresponding to the control movement triggered by the user. For example, the terminal device may highlight, on the basis of FIG. 10-b, a fast-forward option to indicate that the user triggers the fast-forward function of the terminal device.

The following uses an example to describe, based on step 202 to step 204, a process in which an image collection device recognizes a target body part movement in an environmental image. Refer to FIG. 11-a to FIG. 11-c. In a process of recognizing a dynamic activation movement, FIG. 11-a and FIG. 11-b separately show target body part movements that are triggered by a hand and that are consistent with dynamic activation movements when a specified body part is the hand. FIG. 11-c shows, when a target body part movement triggered by a user is consistent with a control movement, an interface displayed on a terminal device. If the image collection device detects that a gesture in an environmental image is a gesture shown in FIG. 11-a, and detects, in a next frame of environmental image, that a hand is switched to a posture shown in FIG. 11-b, that is, the target body part movements triggered by the user is switching fingers from a separated state to a pinch state, it may be determined that the user triggers the activation movement, and the image collection device may send an interface display instruction to the terminal device, so that the terminal device displays an interface shown in FIG. 10-a. Then, the image collection device may track the hand of the user, and if the image collection device detects that the hand of the user moves in any direction up, down, left, or right, and a movement distance is greater than a preset distance threshold, the image collection device may determine that the target body part movement triggered by the user is consistent with the control movement, so that the image collection device may generate a control instruction and send the control instruction to the terminal device, and the terminal device may further display an interface shown in FIG. 11-c while performing a corresponding operation. Moving the hand upward may be increasing a volume of the terminal device, moving the hand downward may be decreasing the volume of the terminal device, moving the hand leftward may be rewinding a playback progress, and moving the hand rightward may be fast-forwarding the playback progress.

Similarly, FIG. 12-a to FIG. 12-c show a process of recognizing another dynamic activation movement. FIG. 12-a and FIG. 12-b separately show target body part movements that are triggered by a hand and that are consistent with dynamic activation movements when a specified body part is the hand. FIG. 12-c shows, when a target body part movement triggered by a user is consistent with a control movement, an interface displayed on a terminal device. If the image collection device detects that a gesture in an environmental image is a gesture shown in FIG. 12-a, and detects that a gesture in a next frame of environmental image is switched to a posture shown in FIG. 12-b, that is, the target body part movements triggered by the user is switching fingers from a first holding posture to a palm opening posture, it may be determined that the user triggers the activation movement, and the image collection device may send an interface display instruction to the terminal device, so that the terminal device displays an interface shown in FIG. 10-b. Then, the image collection device may track the hand of the user, and if the image collection device detects that the hand of the user moves in any direction up, down, left, or right, and a movement distance is greater than a preset distance threshold, the image collection device may determine that the target body part movement triggered by the user is consistent with the control movement, so that the image collection device may generate a control instruction and send the control instruction to the terminal device, and the terminal device may further display an interface shown in FIG. 12-c while performing a corresponding operation. Moving the hand upward may be displaying a channel list, and selecting a channel to be played upward from the channel list. Similarly, moving the hand downward may also be displaying a channel list, but selecting a channel to be played downward from the channel list. Moving the hand leftward may be switching to a previous channel, and moving the hand rightward may be switching to a next channel.

In addition, FIG. 13-a and FIG. 13-b show a process of recognizing a static activation movement. FIG. 13-a shows a target body part movement that is triggered by a hand and that is consistent with the static activation movement when a body part is specified as the hand. FIG. 13-b shows, when a target body part movement triggered by a user is consistent with a control movement, an interface displayed on a terminal device. If the image collection device detects that a gesture in an environmental image is a gesture shown in FIG. 13-a, and detects that a gesture in a next frame of environmental image is still the posture shown in FIG. 13-a, that is, the target body part movement triggered by the user is a posture in which the hand is always placed on a mouth to indicate to be quiet, it may be determined that the user triggers the static activation movement, and the image collection device may send an interface display instruction to the terminal device, so that the terminal device displays an interface shown in FIG. 10-c. Then, the image collection device may track the hand of the user. In a tracking process, the terminal device may display a countdown progress bar in the interface shown in FIG. 10-c. The progress bar may surround a periphery of an inner circular pattern in the interface, and gradually constitute a ring as the countdown progresses. When the ring is formed, it indicates that the countdown ends. If the hand of the user always maintains a posture shown in FIG. 13-a in the countdown process, in this case, the target body part movement that the image collection device may determine is consistent with the control movement. Correspondingly, the terminal device may display an interface shown in FIG. 13-b, indicating that the static activation movement is successfully triggered, and the terminal device is controlled to perform a mute operation.

Similarly, an image collection device may further detect a gesture shown in FIG. 14. If the image collection device detects that a gesture in an environmental image is a gesture shown in FIG. 14, the image collection device may control a device to perform a pause operation, so that content currently played by the terminal device is paused.

Certainly, in actual application, there may further be another dynamic activation movement, another static activation movement, and another control movement. In embodiments of this application, the activation movements and control movements are merely used as examples for description, and the activation movement, the control movement, the specified body part that triggers the activation movement, and the specified body part that triggers the control movement are not limited.

In conclusion, according to the device control method provided in embodiments of this application, a to-be-recognized region in an environmental image is determined, and a target body part movement triggered by a specified body part in the to-be-recognized region is monitored. If it is monitored that the target body part movement is consistent with an activation movement, whether the target body part movement triggered by the specified body part is consistent with a preset control movement may continue to be monitored, so that when the target body part movement is consistent with the control movement, a terminal device can be controlled to perform a function operation that matches the control movement, whether a user needs to control the terminal device is determined by monitoring whether the target body part movement is consistent with the activation movement, and if the target body part movement is consistent with the activation movement, whether the target body part movement is consistent with the control movement is further monitored, to control the terminal device based on the target body part movement consistent with the control movement. In this way, the terminal device is controlled by using a target body part movement including two-stage movements. This reduces a probability that the user controls the terminal device by merely triggering one target body part movement, reduces a false drop rate of monitoring the triggered movement by an image collection device, and improves accuracy of controlling the terminal device by the image collection device based on the movement triggered by the user.

In addition, when the environmental image collected by the image collection device includes a plurality of users, a target body part movement that is triggered by a user and that is consistent with an activation movement or a control movement may be recognized from each to-be-recognized region in descending order of an area of each to-be-recognized region. This avoids that the terminal device performs a plurality of movements due to simultaneous recognition of movements triggered by the plurality of users, and improves stability of controlling the terminal device.

In addition, in a process of determining a to-be-recognized region, a focus region is first generated based on a face region and a body region that are recognized. This can increase a probability of recognizing a specified body part, and the to-be-recognized region is generated based on a plurality of focus regions, so that workload required by the image collection device to recognize the specified body part can be reduced.

It should be understood that sequence numbers of the steps do not mean an execution sequence in the embodiments. The execution sequence of the processes should be determined based on functions and internal logic of the processes, and should not constitute any limitation on implementation processes of embodiments of this application.

Corresponding to the device control method in the embodiments, FIG. 15 is a block diagram of a structure of a device control apparatus according to an embodiment of this application. For ease of description, only parts related to embodiments of this application are shown.

Refer to FIG. 15. The apparatus includes:

a recognition module 1501, configured to: recognize a collected environmental image, and determine at least one to-be-recognized region in the environmental image, where the to-be-recognized region includes a specified body part used to control a terminal device;

a monitoring module 1502, configured to monitor a target body part movement in the to-be-recognized region, where the target body part movement is a movement triggered by the specified body part;

a tracking module 1503, configured to: if it is monitored that the target body part movement is consistent with a preset activation movement, track and monitor a target body part movement in a target to-be-recognized region, where the target to-be-recognized region is a to-be-recognized region in which a target body part movement consistent with the activation movement is located; and a control module 1504, configured to: if it is monitored that the target body part movement in the target to-be-recognized region is a preset control movement, control the terminal device to perform a function operation corresponding to the control movement.

Optionally, the recognition module 1501 is specifically configured to: collect the environmental image, recognize a face region and a body region of each user in the environmental image, and determine the at least one to-be-recognized region based on the plurality of face regions and the plurality of body regions.

Optionally, the recognition module 1501 is further specifically configured to: generate focus regions corresponding to the users based on the face region and the body region of the user for each user, and cluster the plurality of focus regions based on intersection over union between every two focus regions of the plurality of focus regions to obtain the at least one to-be-recognized region.

Optionally, the recognition module 1501 is further specifically configured to: cluster the plurality of focus regions based on the intersection over union between every two focus regions of the plurality of focus regions to obtain at least one cluster, where the cluster includes at least one focus region, and if the cluster includes a plurality of focus regions, intersection over union between any focus region in the cluster and at least one another focus region in the cluster is greater than a preset intersection over union threshold; determine a region boundary of each cluster based on a location of each focus region in each cluster in the environmental image; and generate, based on the region boundary of each cluster, the to-be-recognized region corresponding to each cluster.

Optionally, the activation movement includes a dynamic activation movement.

The monitoring module 1502 is specifically configured to: if the target body part movement triggers movement switching, and the switching movement is consistent with the dynamic activation movement, determine that the target body part movement in the to-be-recognized region is consistent with the dynamic activation movement.

Optionally, the activation movement includes a static activation movement.

The monitoring module 1502 is specifically configured to: if the target body part movement is consistent with the static activation movement and duration is longer than a preset time threshold, determine that the specified body part triggers the static activation movement.

Optionally, the monitoring module 1502 is specifically configured to: obtain an area of each to-be-recognized region; and monitor, based on the area of each to-be-recognized region, a target body part movement in each to-be-recognized region in descending order of the area of each to-be-recognized region.

Optionally, the control module 1504 is specifically configured to: determine a function corresponding to the control movement; generate a control instruction based on the function corresponding to the control movement; and send the control instruction to the terminal device, where the control instruction instructs the terminal device to perform the function operation corresponding to the control movement.

Figure 16:
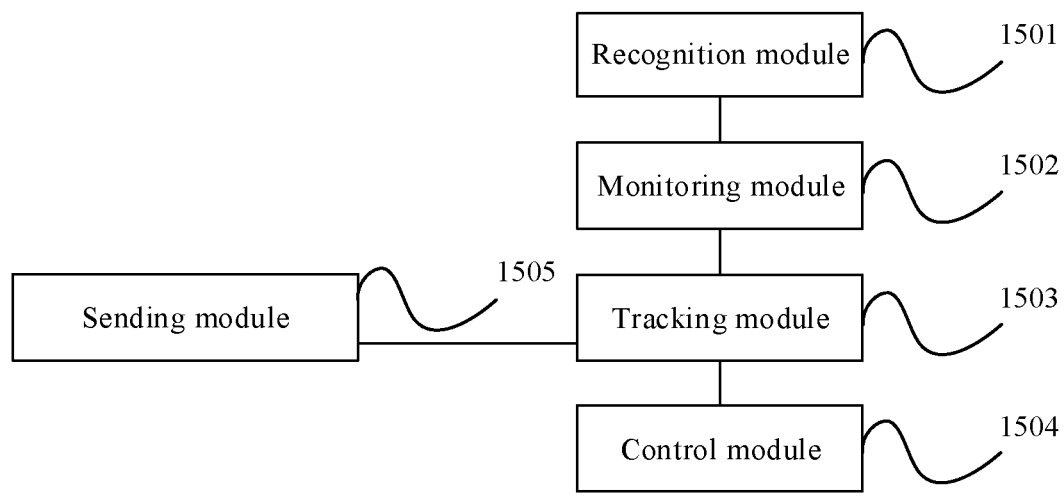
FIG. 16 is a block diagram of a structure of another device control apparatus according to an embodiment of this application.

Optionally, as shown in FIG. 16, the apparatus further includes:

a sending module 1505, configured to send an interface display instruction to the terminal device, where the interface display instruction instructs the terminal device to display a control interface.

In conclusion, a device control apparatus provided in embodiments of this application determines a to-be-recognized region in an environmental image, and monitors a target body part movement triggered by a specified body part in the to-be-recognized region. If the device control apparatus detects that the target body part movement is consistent with an activation movement, the device control apparatus may continue to monitor whether the target body part movement triggered by the specified body part is consistent with a preset control movement, so that when the target body part movement is consistent with the control movement, the device control apparatus can control a terminal device to perform a function operation that matches the control movement. The device control apparatus determines whether a user needs to control the terminal device by monitoring whether the target body part movement is consistent with the activation movement, and if the target body part movement is consistent with the activation movement, the device control apparatus further monitors whether the target body part movement is consistent with the control movement, to control the terminal device based on the target body part movement consistent with the control movement. In this way, the device control apparatus controls the terminal device by using a target body part movement including two-stage movements. This reduces a probability that the user controls the terminal device by merely triggering one target body part movement, reduces a false drop rate of monitoring the triggered movement by an image collection device, and improves accuracy of controlling the terminal device by the image collection device based on the movement triggered by the user.

An embodiment of this application further provides an image collection device, including: a memory, a processor, and a computer program that is stored in the memory and that can be run on the processor. When executing the computer program, the processor implements the device control method shown in any one of FIG. 2.

An embodiment of this application further provides a computer-readable storage medium. The computer-readable storage medium stores a computer program. When the computer program is executed by a processor, the processor implements the device control method shown in any one of FIG. 2.

It may be clearly understood by a person skilled in the art that, for the purpose of convenient and brief description, division of the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on a particular application and a design constraint condition of the technical solutions. A person skilled in the art may use different methods to implement the described functions for each particular application, but it should not be considered that the implementation goes beyond the scope of this application.

In embodiments provided in this application, it should be understood that the disclosed apparatus and method may be implemented in other manners. For example, the described system embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to an image collection device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard drive, a magnetic disk, or an optical disk. In some jurisdictions, the computer-readable medium cannot be the electrical carrier signal or the telecommunications signal according to legislation and patent practices.

The foregoing embodiments are merely intended to describe the technical solutions of this application, but are not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application, and these modifications and replacements shall fall within the protection scope of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application should be subject to the protection scope of the claims.

What is claimed is:

1. A device control method, comprising:
   recognizing a collected environmental image;
   determining at least one to-be-recognized region in the environmental image, wherein the to-be-recognized region comprises a specified body part used to control a terminal device, wherein the environmental image comprises images of a plurality of users, and determining at least one to-be-recognized region in the environmental image comprises:
      for each of the plurality of users in the environmental image, generating a focus region corresponding to the respective user based on an overlapping region between a face region of the respective user and a body region of the respective user;
   monitoring a target body part movement in the to-be-recognized region, wherein the target body part movement is a movement triggered by the specified body part; and
   performing at least one of the following:
      in response to determining that the target body part movement is consistent with a preset activation movement, tracking and monitoring a target body part movement in a target to-be-recognized region, wherein the target to-be-recognized region is a to-be-recognized region in which a target body part movement consistent with the activation movement is located; or
      in response to determining that the target body part movement in the target to-be-recognized region is a preset control movement, controlling the terminal device to perform a function operation corresponding to the control movement.

2. The method according to claim 1, wherein the recognizing a collected environmental image comprises collecting the environmental image, and determining at least one to-be-recognized region in the environmental image comprises:
   recognizing the face region and the body region of each user of the plurality of users in the environmental image.

3. The method according to claim 2, wherein the determining the at least one to-be-recognized region in the environmental image comprises:
   clustering the plurality of focus regions based on intersection over union between every two focus regions of the plurality of focus regions to obtain the at least one to-be-recognized region.

4. The method according to claim 3, wherein the clustering the plurality of focus regions based on intersection over union between every two focus regions of the plurality of focus regions to obtain the at least one to-be-recognized region comprises:
   clustering the plurality of focus regions based on the intersection over union between every two focus regions of the plurality of focus regions to obtain at least one cluster, wherein the cluster comprises at least one focus region, and if the cluster comprises a plurality of focus regions, intersection over union between any focus region in the cluster and at least one another focus region in the cluster is greater than a preset intersection over union threshold;
   determining a region boundary of each cluster based on a location of each focus region in each cluster in the environmental image; and
   generating, based on the region boundary of each cluster, the to-be-recognized region corresponding to each cluster.

5. The method according to claim 1, wherein the activation movement comprises a dynamic activation movement;
   the monitoring a target body part movement in the to-be-recognized region comprises:
      when the target body part movement triggers movement switching, and the switching movement is consistent with the dynamic activation movement, determining that the target body part movement in the to-be-recognized region is consistent with the dynamic activation movement.

6. The method according to claim 1, wherein the activation movement comprises a static activation movement;
   the monitoring a target body part movement in the to-be-recognized region comprises:
      when the target body part movement is consistent with the static activation movement and duration is longer than a preset time threshold, determining that the specified body part triggers the static activation movement.

7. The method according to claim 1, wherein the monitoring a target body part movement in the to-be-recognized region comprises:

obtaining an area of each to-be-recognized region; and monitoring, based on the area of each to-be-recognized region, a target body part movement in each to-be-recognized region in descending order of the area of each to-be-recognized region.

8. The method according to claim 1, wherein the controlling the terminal device to perform a function operation corresponding to the control movement comprises:

determining a function corresponding to the control movement;

generating a control instruction based on the function corresponding to the control movement; and sending the control instruction to the terminal device, wherein the control instruction instructs the terminal device to perform the function operation corresponding to the control movement.

9. The method according to claim 1, wherein the method further comprises:

sending an interface display instruction to the terminal device, wherein the interface display instruction instructs the terminal device to display a control interface.

10. A terminal device, comprising:

at least one processor; and one or more memories coupled to the at least one processor and storing programming instructions for execution by the at least one processor to cause the terminal device to perform following operations:

recognizing a collected environmental image;

determining at least one to-be-recognized region in the environmental image, wherein the to-be-recognized region comprises a specified body part used to control a terminal device, wherein the environmental image comprises images of a plurality of users, and determining at least one to-be-recognized region in the environmental image comprises:

for each of the plurality of users in the environmental image, generating a focus region corresponding to the respective user based on an overlapping region between a face region of the respective user and a body region of the respective user;

monitoring a target body part movement in the to-be-recognized region, wherein the target body part movement is a movement triggered by the specified body part; and performing at least one of the following:

in response to determining that the target body part movement is consistent with a preset activation movement, tracking and monitoring a target body part movement in a target to-be-recognized region, wherein the target to-be-recognized region is a to-be-recognized region in which a target body part movement consistent with the activation movement is located; or in response to determining that the target body part movement in the target to-be-recognized region is a preset control movement, controlling the terminal device to perform a function operation corresponding to the control movement.

11. The terminal device according to claim 10, wherein the recognizing a collected environmental image comprises collecting the environmental image, and determining at least one to-be-recognized region in the environmental image comprises:

recognizing the face region and the body region of each user of the plurality of users in the environmental image.

12. The terminal device according to claim 11, wherein the determining the at least one to-be-recognized region in the environmental image comprises:

clustering the plurality of focus regions based on intersection over union between every two focus regions of the plurality of focus regions to obtain the at least one to-be-recognized region.

13. The terminal device according to claim 10, wherein the clustering the plurality of focus regions based on intersection over union between every two focus regions of the plurality of focus regions to obtain the at least one to-be-recognized region comprises:

clustering the plurality of focus regions based on the intersection over union between every two focus regions of the plurality of focus regions to obtain at least one cluster, wherein the cluster comprises at least one focus region, and if the cluster comprises a plurality of focus regions, intersection over union between any focus region in the cluster and at least one another focus region in the cluster is greater than a preset intersection over union threshold;

determining a region boundary of each cluster based on a location of each focus region in each cluster in the environmental image; and generating, based on the region boundary of each cluster, the to-be-recognized region corresponding to each cluster.

14. The terminal device according to claim 10, wherein the activation movement comprises a dynamic activation movement; and wherein the monitoring a target body part movement in the to-be-recognized region comprises:

when the target body part movement triggers movement switching, and the switching movement is consistent with the dynamic activation movement, determining that the target body part movement in the to-be-recognized region is consistent with the dynamic activation movement.

15. The terminal device according to claim 10, wherein the activation movement comprises a static activation movement; and wherein the monitoring a target body part movement in the to-be-recognized region comprises comprise:

when the target body part movement is consistent with the static activation movement and duration is longer than a preset time threshold, determining that the specified body part triggers the static activation movement.

16. The terminal device according to claim 10, wherein the monitoring a target body part movement in the to-be-recognized region comprises:

obtaining an area of each to-be-recognized region; and monitoring, based on the area of each to-be-recognized region, a target body part movement in each to-be-recognized region in descending order of the area of each to-be-recognized region.

17. The terminal device according to claim 10, wherein the controlling the terminal device to perform a function operation corresponding to the control movement comprises:

determining a function corresponding to the control movement;

generating a control instruction based on the function corresponding to the control movement; and sending the control instruction to the terminal device, wherein the control instruction instructs the terminal device to perform the function operation corresponding to the control movement.

18. The terminal device according to claim 10, wherein the operations comprise:

sending an interface display instruction to the terminal device, wherein the interface display instruction instructs the terminal device to display a control interface.

19. A non-transitory computer-readable storage medium, wherein the computer-readable storage medium stores a computer program, and when the computer program is executed by one or more processors, causes an apparatus to perform operations comprising:
recognizing a collected environmental image;
determining at least one to-be-recognized region in the environmental image, wherein the to-be-recognized region comprises a specified body part used to control a terminal device, wherein the environmental image comprises images of a plurality of users, and determining at least one to-be-recognized region in the environmental image comprises:
for each of the plurality of users in the environmental image, generating a focus region corresponding to the respective user based on an overlapping region between a face region of the respective user and a body region of the respective user;
monitoring a target body part movement in the to-be-recognized region, wherein the target body part movement is a movement triggered by the specified body part; and
performing at least one of the following:
in response to determining that the target body part movement is consistent with a preset activation movement, tracking and monitoring a target body part movement in a target to-be-recognized region, wherein the target to-be-recognized region is a to-be-recognized region in which a target body part movement consistent with the activation movement is located; or
in response to determining that the target body part movement in the target to-be-recognized region is a preset control movement, controlling the terminal device to perform a function operation corresponding to the control movement.

20. The non-transitory computer-readable storage medium according to claim 19, wherein the monitoring a target body part movement in the to-be-recognized region comprises:
obtaining an area of each to-be-recognized region; and
monitoring, based on the area of each to-be-recognized region, a target body part movement in each to-be-recognized region in descending order of the area of each to-be-recognized region.

* * * * *

UNITED STATES PATENT AND TRADEMARK OFFICE
CERTIFICATE OF CORRECTION

PATENT NO. : 11,880,220 B2  
APPLICATION NO. : 17/913521  
DATED : January 23, 2024  
INVENTOR(S) : Jihao Wu Page 1 of 1

It is certified that error appears in the above-identified patent and that said Letters Patent is hereby corrected as shown below:

On the Title Page

Column 1 Item (30) (Foreign Application Priority Data), Line 1, please delete "2020102117973.5" and insert therefore -- 202010211797.5 --;

In the Claims

Column 26, Line 8, Claim 13, please delete "claim 10," and insert therefore -- claim 12, --.

Signed and Sealed this  
Fifth Day of November, 2024

Katherine Kelly Vidal  
*Director of the United States Patent and Trademark Office*